INVENTOR.
GUNTER WOLF
BY
AGENT

Dec. 20, 1966 G. WOLF 3,292,835

VIBRATORY DRIVE FOR INTERMITTENT TAPE TRANSPORT

Filed March 24, 1965 2 Sheets-Sheet 2

INVENTOR
GUNTER WOLF

BY

AGENT

United States Patent Office 3,292,835
Patented Dec. 20, 1966

3,292,835
VIBRATORY DRIVE FOR INTERMITTENT TAPE TRANSPORT

Gunter Wolf, Hamburg, Stellingen, Germany, assignor to North American Philips Company, Inc., New York, N.Y., a corporation of Delaware Filed Mar. 24, 1965, Ser. No. 442,245
Claims priority, application Germany, Mar. 28, 1964, P 33,933
4 Claims. (Cl. 226—162)

Figure 4:
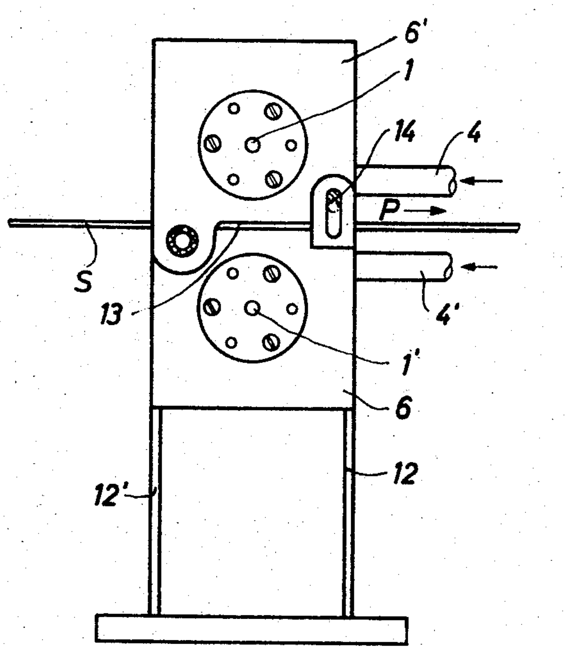

The invention relates to apparatus for printing or punching record carriers in tape form and in particular a drive means therefor.

In such apparatus operation in a start-stop manner is required, i.e., for each sign it must be possible to stop the record carrier, therefore, discontinuous movement of some members cannot be avoided. However, when the operating speed of such members increases, the accelerative and retardation forces, i.e., the forces due to gravity and/or inertia of the discontinuously moving structural members, increase also, namely as a quadratic. Consequently it is senseless to try and reach increased operating speed by a heavier mechanical construction. Decrease of the moments of inertia and as a result an increase of the speed is possible only to a slight extent since any given material can only be stressed up to the limit of its strength.

For comparatively rapid tape transporting mechanisms or drives mainly three driving principles are known:

(1) Driving by means of a crank or eccentric;

(2) Driving by means of a cam disc or more in general by a profiled disc;

(3) Passing of the record carrier between the two drums which are forced against each other and rotate in opposite directions.

A crank or eccentric drive requires a comparatively large number of mechanical component parts. Since the moments of inertia of such a drive cannot be compensated, when converting a rotary movement into a reciprocating movement, forces occur which, in particular at the bearings, tend to deform the construction. Therefore, even when the largest load possible is imposed on the material of such a drive it is not possible to increase the speed significantly.

In the cam or profiled disc-drive, the number of discontinuously moving components is fewer and the masses also can be kept smaller. However, in case of a cam disc drive strong reacting forces are required to maintain good engagement of the components (cam and follower) sliding over each other. Owing to surface pressure the forces required to keep the components in engagement cannot be increased arbitrarily as a result of which a significant limit is also imposed upon the operating speed of this drive.

Profiled disc drives in which the parts cooperating with the discs follow the contour of a groove do not require forced engagement. However, the slightest wear of the profile groove will cause some play between the parts which uncontrollably varies the movement ratios and the resulting impacts cause the drive to become defective rapidly.

In the third drive principle there are continuously moving masses, as a result of which no effects of forces of inertia occur. However, such a drive principle is unsuitable for start-stop-operation.

According to the invention, the drive, in which the drawbacks associated with the known drives are avoided, consists of two eccentric, axis-parallel, masses rotating synchronously and in opposite directions in a guided frame or housing which serves as the member for moving the record carrier.

As a result of the forces due to inertia produced by the eccentric masses, the housing and the frame respectively perform forced harmonic oscillations with a constant amplitude. The stroke of the housing is independent of the number of rotations of the shafts and is also independent of the extent of damping.

Figure 1:
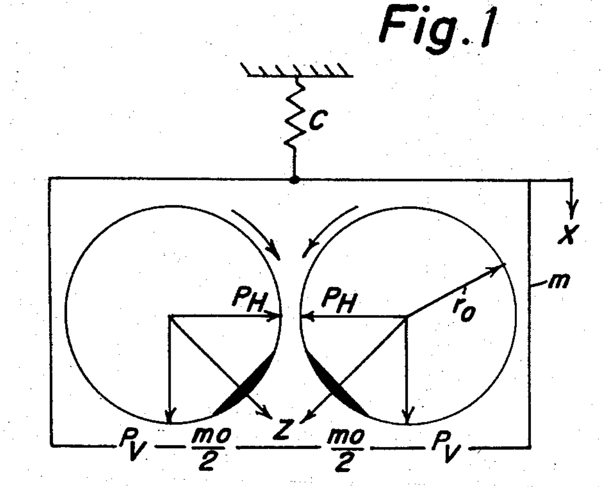
Figure 2:
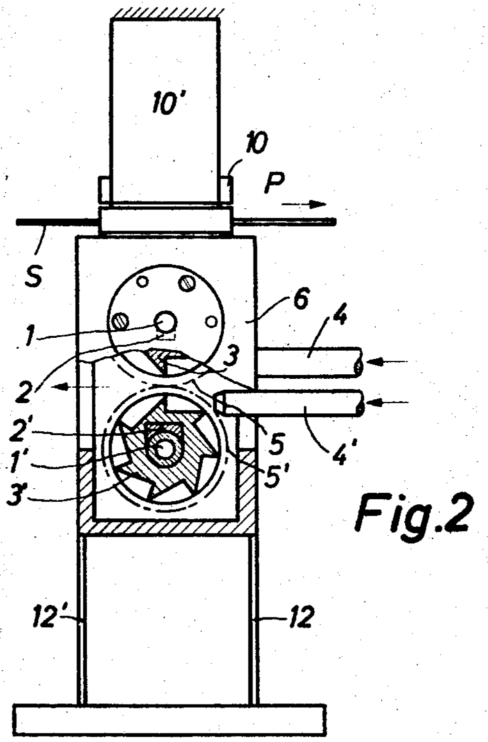
Figure 3:
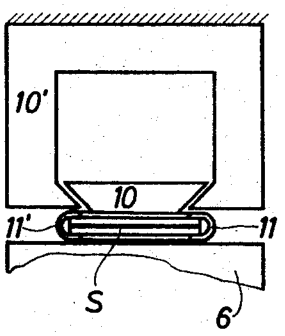

In order that the invention may readily be carried into effect, it will now be described in greater detail, by way of example, with reference to the accompanying drawing in which FIGURE 1 is a schematic diagram to explain the principle, FIGS. 2 and 3 are diagrammatic views of an embodiment, for example, for an intermittent tape transport, and FIG. 4 shows a further example of tape transport.

The eccentric masses $m_0/2$ rotating in opposite directions each produce a centrifugal force Z, of which the components $P_H$ neutralize each other when acting at right angles to the path of oscillation, the components $P_V$ when acting in the direction of the path of oscillation being added to each other (FIG. 1). The centrifugal force Z is:

$$Z=m_0\cdot r_0\cdot \Omega^2\cdot \cos \Omega t$$

where $r_0$=the radius on which the eccentric mass lies and $\Omega$ is the angular speed of the shafts. After solving the oscillation equation while neglecting the small natural damping, a build-up function is obtained which has the property of approaching unity at low natural frequency and at a high frequency of excitation. It is not difficult to make the natural frequency very small, that is to say, to omit the spring $c$ and to provide only a guiding for the housing $m$ so that the build-up function may be said to be unity. In this manner no danger exists that the oscillating assembly becomes resonant since the oscillator operates only in the over-critical range. At the same time, the influence of damping disappears in this range. The amplitude $x$ is determined exclusively by structural dimensions. The oscillation frequency of the housing $m$ corresponds to the rotation frequency of the shafts. Since the number of rotations of the shafts does not vary the stroke X and small fluctuations of the number of rotations has no influence on the correct functioning of the drive, a turbine wheel may be provided to produce the rotary movement of each shaft.

Known miniature air turbines supply powers (of approximately 40 watts) which are sufficient for driving the eccentrics needed for a tape transport. The driving of the shafts by a miniature air turbine is also favorable, because technically it is simple to manufacture and it renders high speed rotation possible, thus, for 500 strokes of the housing, for example, rotation of 30,000 r.p.m. is required which cannot be realized in another manner without using more component parts.

A further possibility of rotating the eccentrics is by transmitting the energy from a fixed motor by means of a flexible shaft, for example a wire, or, since the stroke is comparatively small, by using flexible couplings.

In FIG. 2, eccentric masses 2 and 2' are provided on the shafts 1 and 1'. Since the number of rotations of the shafts does not vary the stroke of the housing 6 and small fluctuations of the number of rotations do not influence the operation of the drive, a turbine wheel 3 and 3', respectively, may be provided for producing the rotary motion for each shaft. These turbine wheels are each driven with compressed air via fixed nozzle 4 and 4' respectively. Since the stroke X is very small, a fixed pipe may be chosen. The toothed wheels 5 and 5' guarantee that no phase shift can occur between the shafts 1 and 1'.

No high requirements are imposed for guiding of the housing. As an example are shown two plate springs 12, 12', which guarantee a ready guiding without wear with slight resilient mass. A different guiding of the housing could be obtained by a known air bearing.

When in FIGURES 2 and 3 a tape S is to be transported in the direction of the arrow P, a small electromagnet armature 10, for example, which is rigidly connected to the housing 6, may clamp the tape to the housing, when the tape is to be transported. After the housing has moved through amplitude $x$ in one direction, the fixed magnet 10' is switched off, so that the clamping connection is released during the return of the housing.

The armature 10 is guided, for example, by two bent-leaf springs 11, 11' and moved away from the perforated tape S when the magnet is not energized. The guiding of the housing 6 is effected by two plate springs 12, 12'.

A further possibility consists in that the components of the centrifugal forces $P_H$ at right angles to the oscillatory movement are used for clamping and moving along the tape. (FIG. 4.)

In this case, the shafts 1, 1' must be journalled in a two part housing 6, 6' so that the horizontal center lines are parallel. These parts 6, 6' are coupled together in a manner such that between them a gap 13 is formed, which must be variable in height to a small extent. As shown in FIG. 4, the tape S is passed between the parts of the housing 6, 6' in the gap 13 therebetween. The components $P_V$ cause both parts of the housing 6, 6' to oscillate in the direction of the arrow P. Since the components of the centrifugal force $P_H$ force the housing parts against the tape it moves with the parts 6, 6'. During the return movement of the parts 6, 6' of the housing in the opposite direction, the force $P_H$ changes by 180° so that the housing parts separate or move away from the tape S.

A stop member 14 prevents the gap 13 from becoming too wide. If the tape is not to be transported, movement of the housing parts 6, 6' is prevented by a blocking means such as a magnetic armature (not shown).

The tape S, or record carrier, is accelerated according to a sinusoidal variation from the rest condition and braked also sinusoidally so that the stress of the tape is a minimum. The stroke X of the housing is independent of the number of rotations of the eccentric masses and the damping of the system. However, the number of rotations can be increased continuously from low to very high values and thus also the number of transport steps per second or frequency of the strokes. The movement is carried out sinusoidally, i.e., without impact. In the new drive, wear can only occur in the shaft bearings. Since the housing oscillates together with the shafts, the shafts with the attached components exert forces on the bearings as a result of the moments of inertia. In the reversal points, where the forces due to inertia reach a maximum, the centrifugal forces of the eccentric masses are exactly opposite as a result of which the stress becomes more even. However, this problem is surmountable in view of the present state of bearing technology.

What is claimed is:

1. A drive for intermittent tape transport comprising a housing, means for supporting said housing for oscillatory movement, drive means coupled with said housing including a pair of eccentric masses and means for rotating said masses synchronously in parallel planes and in opposite directions whereby said housing is oscillated, and means connected with said housing for intermittently clamping said tape to said housing for transporting said tape during part of the movement of said housing.

2. A drive according to claim 1 wherein said clamping means comprises fixed electromagnetic means having a movable armature engageable with said housing.

3. A drive according to claim 2 wherein said means for rotating said masses comprises an air turbine connected with each said mass and gear means interconnecting said turbines for preventing a phase shift between said masses.

4. A drive according to claim 1 wherein said housing comprises discrete first and second portions, each said portion having one of said eccentric masses operatively associated therewith, and said means for clamping said tape including means for connecting said portions for movement together and a part whereby a tape received between said first and second portions is intermittently clamped therebetween.

References Cited by the Examiner

UNITED STATES PATENTS 3,044,678 7/1962 Stemme ---------- 226—162 X

M. HENSON WOOD, Jr., *Primary Examiner.*

A. N. KNOWLES, *Assistant Examiner.*